UNITED STATES PATENT OFFICE 2,310,109

METHOD FOR PRODUCTION OF CAPILLARY ACTIVE MEDIA

Richard Neu, Dessau, Anhalt, Germany, assignor, by mesne assignments, to "Unichem" Chemikalien Handels A.-G., Zurich, Switzerland, a corporation of Switzerland No Drawing. Application January 15, 1938, Serial No. 185,227. In Germany January 16, 1937

17 Claims. (Cl. 260—294)

Capillary active media are obtainable by re-arranging the acid salts of non-saturated or mono-halogenated or, respectively, hydroxylated di- or poly-carboxylic acids or, respectively, their reactive derivatives and tertiary amines containing an alkyl-residue of not less than 6 C atoms in the molecule, to the corresponding compounds of the betaine-type. These unsaturated, halogenated and hydroxylated polycarboxylic acids may be referred to collectively as aliphatic polycarboxylic acids which are readily reactive at an intermediate carbon atom.

This re-arrangement is in a general way performed by warming the acid carboxylic salts of the tertiary bases to temperatures over 100° C. and preferably to 120–160° C. either alone or in the presence of solvents accelerating the conversion such as alcohols, e. g., cyclohexanol, benzyl-alcohol, ketones, e. g., cyclohexanone, cyclo-pentanone, aceto-phenone, hydrocarbons and the like.

As suitable amines to be considered for the conversion in question there may be cited, e. g., hexyl-N-piperidine, hexadecyl-N-piperidine, dodecyl-N-isoquinoline-tetrahydride, dimethyl-dodecyl-amine and methyl-oleyl-phenyl-amine; among the di- or poly-carboxylic acids or, respectively, their reactive derivatives suitable for the purpose there are, e. g., fumaric acid, maleic acid, itaconic acid, aconitic acid, bromosuccinic acid, chloro-sebacic acid, maleic acid-mono-ethyl ester and the like.

The ready availability of those betaines, the conversion of which takes a practically quantitative course, requires no tedious working-up of the reaction-products. The betaines are fast to diluted alkalis, which fact is of a particular advantage, and they permit being applied in acid as well as in alkaline solutions as wetting-out-, washing-, emulsifying-, dispersing and deterging agents. They are particularly suitable for linen and further as equalizing media for vatting-dye stuffs, as expedients in textile-printing, etc. The betaines corresponding to the present invention may be applied in the form of the resulting acid compounds or as salts of potassium, sodium, or ammonia or of organic bases. In certain cases the carboxyl group being still free may also be esterified with alcohols.

Example 1

116.1 g. (1 g. mol.) of maleic acid are dissolved in ether and added, under stirring, to a solution of 309 g. (1 g. mol.) of hexadecyl-piperidine in ether. The resulting white deposit obtained is then filtered and washed out with ether. The acid maleic hexadecyl-piperidine is then, in a flask, heated in an oil-bath up to 130° C. until a sample taken out dissolves clear in water and until no further precipitation occurs when adding a 10%-sodium lye solution.

The thus formed succinic acid-cetyl-piperidine-betaine is suitable for application as an aqueous 2%-solution for the washing of linen.

The acid maleic hexadecyl-piperidine may also, after being dissolved in hydrocarbons, alcohols or ketones, be heated in the reflux-cooler or in the autoclave, until the conversion into the corresponding betaine be accomplished.

Example 2

197 g. of bromo-succinic acid are dissolved in ether and added, under stirring, to an etheral solution of 604 g. of dodecyl-N-isoquinoline-tetrahydride. The resulting deposit is worked up as per Example 1 and converted into the succinic acid-dodecyl-N-isoquinoline-tetrahydride-betaine by heating up to 120–130° C. until it will dissolve completely in water. This condensation-product possesses soap-properties when in an aqueous solution.

I claim:

1. A process for producing capillary active compounds which comprises forming acid amine salts by reacting tertiary amines containing at least one alkyl radical of at least six carbon atoms and an aliphatic polycarboxylic acid readily reactive at an intermediate carbon atom of the class consisting of $\alpha$, $\beta$ unsaturated-, $\alpha$ monohalogenated-, and $\alpha$ and $\beta$ monohydroxylated-carboxylic acids, and heating the acid amine salts formed to a temperature above 100° C. until a rearrangement of the atoms takes place and forms compounds of the betaine-type.

2. Betaine-type compounds of the general formula:

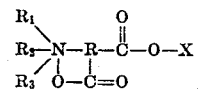

wherein R stands for an aliphatic radical joined to the N atom at a carbon atom not farther than the second from the carbon atom of the cyclic carboxyl group, $R_1$, $R_2$ and $R_3$ stand for at least two hydrocarbon groups at least one of which is an alkyl radical of at least six carbon atoms, and X stands for a member of the group consisting of H, a salt-forming metal and an ester-forming radical.

3. The method for the production of capillary active media which comprises forming acid amine salts of tertiary amines containing at least one alkyl radical of not less than 6 carbon atoms with aliphatic polycarboxylic acid compounds readily reactive at an intermediate carbon atom and having in their structure an $\alpha$, $\beta$ unsaturated bond, and heating the acid amine salts to a temperature in excess of 100° C. until molecular rearrangement occurs and compounds of the betaine type are formed.

4. A method for producing capillary active media which comprises forming acid amine salts of tertiary amines containing at least one alkyl radical of not less than 6 carbon atoms with aliphatic polycarboxylic acids readily reactive at an intermediate carbon atom of the group consisting of $\alpha, \beta$ unsaturated, $\alpha$ monohalogenated and $\alpha$ and $\beta$ monohydroxylated carboxylic acids, and heating the acid amine salts at a temperature between 120 and 160° C. in the presence of an organic solvent of the group consisting of alcohols, ketones and hydrocarbons until a molecular rearrangement of said amine salts occurs and compounds of the betaine type are formed.

5. Betaine-type compounds of the general formula:

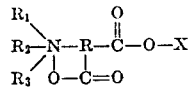

wherein R stands for an alkylene member of from 2 to 8 carbon atoms joined to the N atom at a carbon atom not farther than the second from the carbon atom of the cyclic carboxyl group, $R_1$, $R_2$ and $R_3$ stand for at least two hydrocarbon groups, one of which is an alkyl radical of at least 6 carbon atoms, and X stands for a member of the group consisting of H, a salt-forming metal and an ester-forming radical.

6. Betaine-type compounds of the general formula:

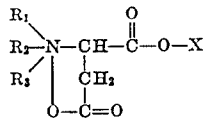

wherein $R_1$, $R_2$ and $R_3$ stand for at least 2 hydrocarbon groups, at least one of which is an alkyl radical of at least 6 carbon atoms, and X stands for a member of the group consisting of H, a salt-forming metal and an ester-forming radical.

7. Betaine-type compounds of the general formula:

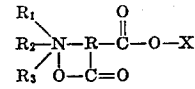

wherein the

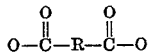

group is a sebacic acid radical, the R being joined to the N atom at a carbon atom thereof not farther than the second from the carbon atom of the cyclic carboxyl group, $R_1$, $R_2$ and $R_3$ stand for at least two hydrocarbon groups, at least one of which is an alkyl radical of at least 6 carbon atoms, and X stands for a member of the group consisting of H, a salt-forming metal and an ester-forming radical.

8. Betaine-type compounds of the general formula:

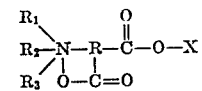

wherein R stands for an aliphatic radical joined to the N atom at a carbon atom not farther than the second from the carbon atom of the cyclic carboxyl group, $R_1$ and $R_2$ for an alkylene radical constituting with the nitrogen atom a piperidine ring, $R_3$ stands for an alkyl radical of at least 6 carbon atoms, and X stands for a member of the group consisting of H, a salt-forming metal and an ester-forming radical.

9. The compounds described in claim 5, wherein $R_1$ and $R_2$ are joined and constitute with the nitrogen atom a piperidine ring.

10. The betaine-type compounds described in claim 6, wherein $R_1$ and $R_2$ are joined and constitute with the nitrogen atom a piperidine ring.

11. The process of producing betaine-type compounds which comprises heating at a temperature over 100° C. a tertiary amine salt of an aliphatic polycarboxylic acid readily reactive at an intermediate carbon atom not farther than the $\beta$ position to a carboxylic group, said tertiary amine radical having at least one alkyl radical of at least 6 carbon atoms, such heating being continued until molecular rearrangement occurs and a betaine-type compound is formed.

12. A process of producing betaine-type compounds which comprises heating at a temperature in excess of 100° C. a tertiary amine salt and an aliphatic carboxylic ester readily reactive at an intermediate carbon atom not farther than the $\beta$ position to a carboxylic group, and containing from 4 to 10 carbon atoms, said tertiary amine radical having at least one alkyl radical of at least 6 carbon atoms, said heating being continued until molecular rearrangement occurs and a betaine-type compound is formed.

13. The process of producing betaine-type compounds which comprises heating at a temperature in excess of 100° C. a tertiary amine acid salt of maleic acid, said tertiary amine radical having at least one alkyl radical of at least 6 carbon atoms, said heating being continued until molecular rearrangement occurs and a betaine-type compound is formed.

14. A process of producing betaine-type compounds which comprises heating at a temperature in excess of 100° C. a tertiary amine salt of bromo-succinic acid, said tertiary amine radical having at least one alkyl radical of at least 6 carbon atoms, said heating being continued until molecular rearrangement occurs and a betaine-type compound is formed.

15. A process of producing a betaine-type compound which comprises heating a tertiary amine salt of chlor sebacic acid, said tertiary amine radical having at least one alkyl radical of at least 6 carbon atoms, said heating being continued until molecular rearrangement occurs and a betaine-type compound is formed.

16. The process of producing a betaine-type compound which comprises heating an alkyl piperidine salt of an aliphatic polycarboxylic acid compound readily reactive at an intermediate carbon atom not farther than the $\beta$ position to a carboxylic group, said alkyl radical having at least 6 carbon atoms, and said heating being continued until a betaine-type compound is formed.

17. The process of producing a betaine-type compound which comprises heating at a temperature in excess of 100° C. an alkyl piperidine salt of an aliphatic polycarboxylic acid readily reactive at an intermediate carbon atom, selected from the group consisting of $\alpha, \beta$ unsaturated acids, $\alpha$ halogenated acids and $\alpha$ and $\beta$ hydroxylated acids, said acid containing from 4 to 10 carbon atoms, said alkyl radical having at least 6 carbon atoms, and said heating being continued until a betaine-type compound is formed.

RICHARD NEU.